(12) United States Patent
Collins

(10) Patent No.: US 11,702,281 B2
(45) Date of Patent: Jul. 18, 2023

(54) COMPUTER-CONTROLLED RUBBISH CONTAINER

(71) Applicant: Pacific Robotics LLC, San Diego, CA (US)

(72) Inventor: Troy Collins, San Diego, CA (US)

(73) Assignee: Pacific Robotics LLC, San Diego, CA (US)

(*) Notice: Subject to any disclaimer, the term of this patent is extended or adjusted under 35 U.S.C. 154(b) by 156 days.

(21) Appl. No.: 17/324,917

(22) Filed: May 19, 2021

(65) Prior Publication Data
US 2022/0371819 A1    Nov. 24, 2022

(51) Int. Cl.
*B62B 3/02* (2006.01)
*B65F 1/14* (2006.01)

(52) U.S. Cl.
CPC .......... *B65F 1/1473* (2013.01); *B62B 3/022* (2013.01); *B62B 2205/14* (2013.01); *B65F 2210/165* (2013.01); *B65F 2210/172* (2013.01)

(58) Field of Classification Search
CPC .............. B65F 1/1473; B65F 2210/165; B65F 2210/172; B62B 3/022; B62B 2205/14
See application file for complete search history.

(56) References Cited

U.S. PATENT DOCUMENTS

| | | | | |
|---|---|---|---|---|
| 7,921,952 B2* | 4/2011 | Tseng | .................... | B60S 9/215 180/199 |
| 8,544,570 B2* | 10/2013 | Ishii | ..................... | B62D 11/24 701/41 |
| 2007/0172341 A1* | 7/2007 | Gregory | ................. | B62B 5/005 414/495 |
| 2022/0363526 A1* | 11/2022 | Huber | ..................... | B25J 11/00 |

* cited by examiner

*Primary Examiner* — Bryan A Evans
(74) *Attorney, Agent, or Firm* — CP Law Group PC; Cy Bates

(57) ABSTRACT

A computer-controlled rubbish container includes a power bank, a control circuit, and a wheel assembly coupled to a bottom portion of a rubbish container. The wheel assembly includes an electric motor coupled to a wheel, wherein the wheel rotates upon a wireless signal sent from a computer to the control circuit. In some embodiments, the wheel assembly is configured to engage and disengage from a ground surface such that the rubbish container is capable of manual pushing.

15 Claims, 10 Drawing Sheets

COMPUTER-CONTROLLED RUBBISH CONTAINER

BACKGROUND

Field of the Invention

The invention relates to robotics, and more particularly, to computer-controlled rubbish containers.

Description of the Related Art

Municipal and commercial entities generally maintain large rubbish containers referred to as "dumpsters", typically having a storage capacity of greater than two cubic yards. Each of the rubbish containers, residential and commercial, require routine servicing (emptying) by a waste management entity ("WME").

Therefore, each week, or otherwise per a routine pickup schedule, residential occupants must transport their rubbish container(s) along a path to place the rubbish container(s) curbside for pickup by the WME. Additionally, subsequent to pickup by the WME, the residential occupants must return the rubbish container(s) away from the curbside, generally transporting them along the path to a home position, such as a side-yard or the like. These acts of transportation can be burdensome on the residential occupants, especially for the elderly and handicapped.

Moreover, WME's picking up commercial dumpsters generally must evacuate a WME collection vehicle to open a gate, push a heavy dumpster outside a protected area for pickup, and subsequent to pickup, must return the dumpster to within the protected facility. The level of involvement required by WME operators is substantial, and can be significantly reduced with advancements in technology.

There is a need in the art for improved rubbish containers for managing waste therein.

SUMMARY

The disclosure concerns improved rubbish containers, more specifically, computer-controlled rubbish containers. The computer-controlled rubbish container includes a power bank, a control circuit, and a motorized wheel assembly coupled to a bottom portion of a rubbish container. The motorized wheel assembly includes an electric motor coupled to a wheel, wherein the wheel rotates upon a wireless signal sent from a computer to the control circuit. The motorized wheel assembly is configured to engage and disengage from a ground surface such that the rubbish container is capable of manual pushing. The improved rubbish containers are disclosed which integrate features such as: actuators for engaging and disengaging the wheel to the ground surface, solar-panels for recharging the power bank coupled to the rubbish containers; the electric motors configured for steering and driving the rubbish containers; and computerized control, and memory coupled therewith, for storing information associated with driving instructions, clock, and the like; among other differentiating features. In addition to automated transportation for curbside pickup, the disclosed embodiments include rubbish containers configured for wireless-signal controlled transportation.

BRIEF DESCRIPTION OF THE DRAWINGS

These and other features of the invention will become apparent to one having the ordinary level of skill in the art upon a thorough review of the following details and descriptions, particularly when reviewed in conjunction with the drawings, wherein.

DETAILED DESCRIPTION

Figure 1:
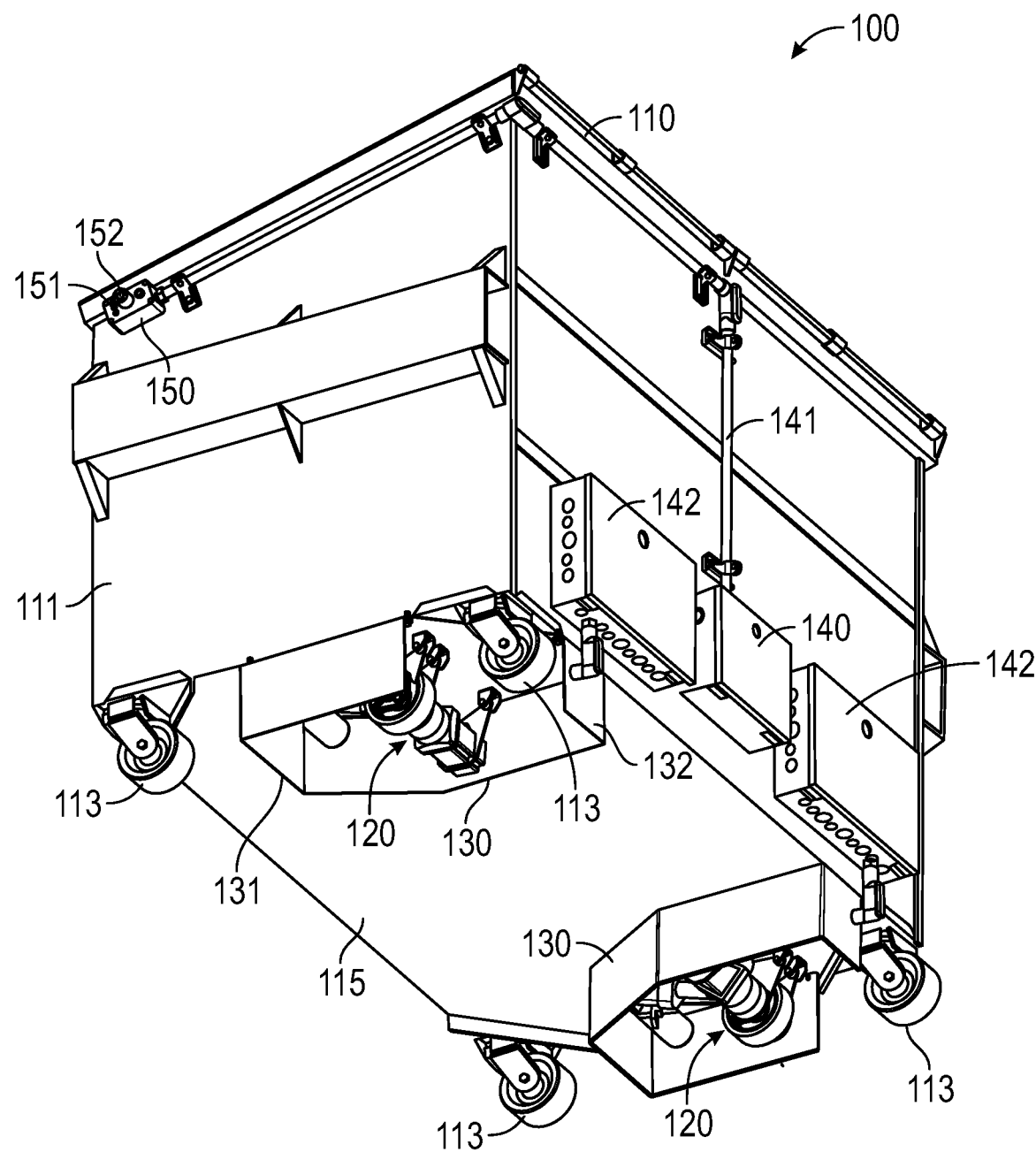
FIG. 1 shows a bottom perspective view of a computer-controlled rubbish container in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "rubbish container" means a container for temporarily storing waste and is usually made of metal or plastic.

The term "dumpster" means a large waste container designed to be hoisted and emptied into a truck, and typically having a storage capacity of greater than two cubic yards.

The term "computer" means any computing device capable of sending a wireless signal such a smartphone, tablet, laptop, or the like.

The term "extended state" means an actuator arm of an actuator predominantly extended outward.

The term "retracted state" means an actuator arm of an actuator predominantly retracted inward.

The term "over-retraction" means when an actuator has retracted too much to the point where subsequent extension is either not possible or the wheel coupled therewith goes in a direction opposite to what is desired.

General Description of Embodiments

In a first embodiment, a computer-controlled rubbish container is disclosed. The computer-controlled rubbish container comprises a rubbish container, two or more motorized wheel assemblies, a plurality of casters, a wheel assembly shield, a power bank and control circuit. The rubbish container includes a top portion and a bottom portion and a receptacle body extending therebetween. Two or more motorized wheel assemblies are coupled to the bottom portion of the rubbish container. The motorized wheel assembly comprises an electric motor, a wheel coupled to the electric motor, and an actuator coupled to the wheel. Upon extension of the actuator, the wheel is configured to engage with a ground surface, and upon retraction of the actuator the wheel is configured to disengage from the ground surface. The rubbish container further includes a plurality of casters coupled to the bottom portion, wherein the plurality of casters is engaged to the ground surface when the actuator is in a retracted state, and the plurality of casters is disengaged from the ground surface when the actuator is in an extended state. The wheel assembly shield is coupled to the bottom portion and configured to surround at least a portion of the motorized wheel assembly. The power bank is configured to provide a power source to the electric motor and actuator. The control circuit couples to the electric motor and is configured to receive a wireless signal comprising said driving instructions for achieving remote drive capability, and subsequently sending instructions to each of the electric motors.

In some embodiments, the computer-controlled rubbish container may further comprise a motor bracket hingedly coupled to the bottom portion and further coupled to the electric motor, and a wheel bracket hingedly coupled to the bottom portion and further coupled to the wheel.

In some embodiments, the wheel assembly shield may further comprise a slanted wall.

In some embodiments the motorized wheel assembly may further comprise a bumper coupled to a wheel bracket, wherein the bumper is configured to engage with the bottom portion and thereby inhibit over-retraction of the actuator.

In some embodiments, the computer-controlled rubbish container may further comprise one or more solar panels coupled to the rubbish container.

In another embodiment, a computer-controlled rubbish container is disclosed. The computer-controlled rubbish container includes a rubbish container having a top portion and a bottom portion and a receptacle body extending therebetween, a motorized wheel assembly coupled to the bottom portion wherein the motorized wheel assembly comprises an electric motor and a wheel coupled to the electric motor, a power bank electrically coupled to the electric motor, and a control circuit coupled to the electric motor for receiving a wireless signal and sending driving instructions to one or more electric motors.

In some embodiments, the motorized wheel assembly may further comprise an actuator coupled to the wheel wherein the wheel is configured to engage to a ground surface when the actuator is in an extended state, the wheel further configured to disengage from the ground surface when the actuator is in a retracted state.

In some embodiments, the computer-controlled rubbish container may further comprise a plurality of casters coupled to the bottom portion of the rubbish container, the plurality of casters is configured to engage the ground surface when the actuator is in the retracted state, the plurality of casters further configured to disengage from the ground surface when the actuator is in the extended state.

In some embodiments, the computer-controlled rubbish container may further comprise a motor bracket hingedly coupled to the bottom portion and further coupled to the electric motor, and a wheel bracket hingedly coupled to the bottom portion and further coupled to the wheel.

In some embodiments, the computer-controlled rubbish container may further comprise a wheel assembly shield coupled to the bottom portion of the rubbish container and configured to surround at least a portion of the motorized wheel assembly. The wheel assembly shield may comprise a slanted wall for deflecting a forklift or other similar object.

In some embodiments the motorized wheel assembly may comprise a bumper coupled to a wheel bracket, wherein the bumper is configured to engage with the bottom portion and thereby inhibit over-retraction of the actuator.

Generally, the computer-controlled rubbish container comprises two or more motorized wheel assemblies.

In some embodiments, the computer-controlled rubbish container may comprise solar panels for charging a battery in the power bank.

In another embodiment, a motorized wheel assembly is disclosed. The motorized wheel assembly, which is configured to couple to a bottom portion of a rubbish container, includes an electric motor, a wheel coupled to the electric motor, a linear actuator coupled to the wheel, the electric motor, or both, and a bumper coupled to the wheel and configured to inhibit over-retraction of the linear actuator. The linear actuator is configured to extend and retract and wherein the wheel is configured to comprise a plurality of positions upon movement of the actuator.

In some embodiments the motorized wheel assembly may further comprise a motor bracket coupled to the electric motor and a wheel bracket coupled to the wheel, wherein the motor bracket and wheel bracket are each configured to hingedly couple to the bottom portion.

In some embodiments the motorized wheel assembly may further comprise a wheel assembly shield configured to couple to the bottom portion and further configured to surround at least a portion of the motorized wheel assembly.

In a general embodiment, a computer-controlled rubbish container includes one or more of the following features:

In some embodiments, the computer-controlled rubbish container may comprise a load cell or other weight-sensing components for determining weight of the rubbish can and/or contents thereof.

In some embodiments, the computer-controlled rubbish container may comprise a weight notification element (audio tone, visual display, light, data element, or other indicator) for indicating to a user: a binary signal (under-weight or overweight, example 50.0 lbs.) or a precision metric (51.1 lbs via data or visual display indicator).

In some embodiments, the computer-controlled rubbish container may comprise wireless charging, such as inductive charging utilizing an electromagnetic field to transfer energy between two objects through electromagnetic induction.

In some embodiments, the computer-controlled rubbish container may comprise wireless control, such as Bluetooth (including: ISM-band communications) or Wi-Fi applications and the like, which utilize a wireless signal emanating from a waste management entity ("WME") vehicle to an antenna and radio system coupled to the rubbish container for connection therebetween, wherein the wireless signal from the WME vehicle is configured to provide computerized instructions to the rubbish container for achieving remote drive capability, wherein an operator of the WME vehicle is enabled access and control over a driving activity of the computer-controlled rubbish container for transporting curbside for waste pickup, and/or returning the rubbish container to a home position for storage.

In some embodiments, the computer-controlled rubbish container may comprise multiple modes, including: rest mode—wherein the motorized wheel assembly is disengaged from ground surface such that a user may free-wheel or move the rubbish container without electric control assist or involvement, and active mode—wherein the motorized wheel assembly is engaged with the ground surface for electric computer-controlled assist and locked positioning.

In some embodiments, the computer-controlled rubbish container may comprise one or more electric-motor driven wheels, including servo motor driven wheel assemblies for advancement and rotational actuation (turning).

In some embodiments, the computer-controlled rubbish container may comprise one or more proximity sensors configured to halt driving and/or redirect steering componentry for avoiding collision.

In some embodiments, the power bank may comprise at least one lithium battery.

In some embodiments, the solar panels may be coupled to a lid-portion of the rubbish container.

Manufacturing

Each of the components of the computer-controlled rubbish container described herein may be manufactured and/or assembled in accordance with the conventional knowledge and level of a person having skill in the art. Features such as water-resistance and weather-proof boxes may be advantageous given the rubbish container is likely exposure to weather elements. Design choices such as o-rings and seals are recommended, especially for power banks and circuit controls which are especially susceptible to rain and moisture.

Standard dumpsters are designed and rated for loads of up to 2000 lbs. To achieve an appropriate walking speed of a computer-controlled rubbish container at full capacity, an appropriate electric motor should be used. One example of such an electric motor comprises a rated speed of 3000 r/min, a gear ratio of 1:35, and an output rated speed of 85 r/m.

Generally, the battery comprises Li-Ion, sealed-lead acid (SLA) or any other battery technology that can be appreciated by one having skill in the art. In an exemplary embodiment, the battery comprises lithium iron phosphate (LFP) technology which are known to have advantageous features including high current peak, steady voltage discharge, and a high cycle life compared to other batteries.

Generally, the wheel is made of polyurethane and has a weight capacity of around 925 lbs. Otherwise, the feature can be fabricated in accordance with the level and knowledge of one having skill in the art. It is preferable for the wheel to comprise non-marking tires or tracks, such as those fabricated from hydrated silicas or similar non-marking materials, for preventing the creation of marks from driving activities The bumper can be obtained commercially, for example and without limitation 9223k67 (https://www.mcmaster.com/9223K67/). Alternatively, the bumper can be customized in accordance with the level and knowledge or one having skill in the art.

First Illustrated Embodiment

Now turning to the drawings, FIG. 1 shows a bottom perspective view of a computer-controlled rubbish container (100) in accordance with a first illustrated embodiment. The computer-controlled rubbish container comprises a rubbish container (110) having a receptable body (111) and a bottom portion (115). Coupled to the bottom portion is a plurality of casters (113) disposed at each corner. Further coupled to the bottom portion are two motorized wheel assemblies (120) each disposed on opposite sides of the rubbish container. Each of the motorized wheel assembles is surrounded in part by a wheel assembly shield (130) such that the motorized wheel assemblies are protected from a forklift or other object which enters the bottom portion of the rubbish container. The wheel assembly shield comprises a proximal end (131) and a distal end (132) wherein the proximal end is near a front of the rubbish container where a user would lift one or more lids (not shown) to dispose of trash. The computer-controlled rubbish container further comprises a power bank (142) and a control circuit (140) coupled via a wiring and wire conduit (141). As shown, the power bank and control power are each disposed on a rear side of the rubbish container. However, alternative locations may also be utilized. Furthermore, in other embodiments, the power bank and control circuit are each encapsulated in a single box. The power bank includes one or more batteries for providing a power source to the control circuit and each of the motorized wheel assemblies. The power bank may further include a charger and AC connector.

The control circuit (140) is coupled to each of the motorized wheel assemblies (200). The control circuit is configured to receive a wireless signal comprising driving instructions and then send instructions to each of the motorized wheel assemblies which corresponds to the driving instructions received. The wireless signal may comprise Bluetooth, WIFI, or any other wireless technology known to one having skill in the art. The instructions may come from a smartphone, tablet, laptop, or any other wireless computing device capable of transmitting driving instructions wirelessly to the computer-controlled rubbish container (100). An application with a friendly use-interface may be utilized to assist a user in sending correct driving instructions from the computing device to the computer-controlled rubbish container. In the illustrated embodiment as shown comprising two motorized wheel assemblies, a "forward" command may result in both motorized wheel assemblies moving forward. Likewise, a "backward" command may result in both motorized wheel assemblies moving backward. For a "right" or "left" command, one of the motorized wheel assemblies may move forward while the other motorized wheel assembly is stationary or moves at a relatively slower speed. An alternative means of turning the rubbish container more rapidly may include having the motorized wheel assemblies move in opposite directions. The application may also benefit from having the ability to emergency stop for the safety of the user and others. Additionally, to prevent incidental touching by the user with the application when the user is not intending on providing driving instructions, the application may auto-lock after a pre-set amount of time, such as 1 second, which will prevent the computer-controlled rubbish container from unintended movement. In a preferred embodiment, the application will also supply additional information to the user, for example, battery charge level and weight of trash contained within the computer-controlled rubbish container.

The rubbish container shown is a dumpster. Dumpsters are typically stored in a discrete location near a business or place of residence and are normally stored in the rear area of the business or place of residence which is out of public view. Constructed walls may also be used for concealing the dumpster. As such, access to the dumpster is difficult for a WME having a large truck. The WME having an ability to control a dumpster remotely from a computer and wireless connection could save time and increase safety as the truck may no longer need to access hard to reach areas. It will be appreciated by one having skill in the art that other rubbish containers may also be used with the claimed invention.

The computer-controlled rubbish container (100), as shown, further comprises a manual control (150). The manual control includes an emergency stop button (520) when upon actuation, overrides and commands from the control circuit (140) and immediately stops the computer-controlled rubbish container. The manual control may also comprise LED indicators (151) which indicate various statuses such as when the motorized wheel assembly (120) is engaged with a ground surface, when a wireless connection is established, and/or a general power indicator.

Figure 2:
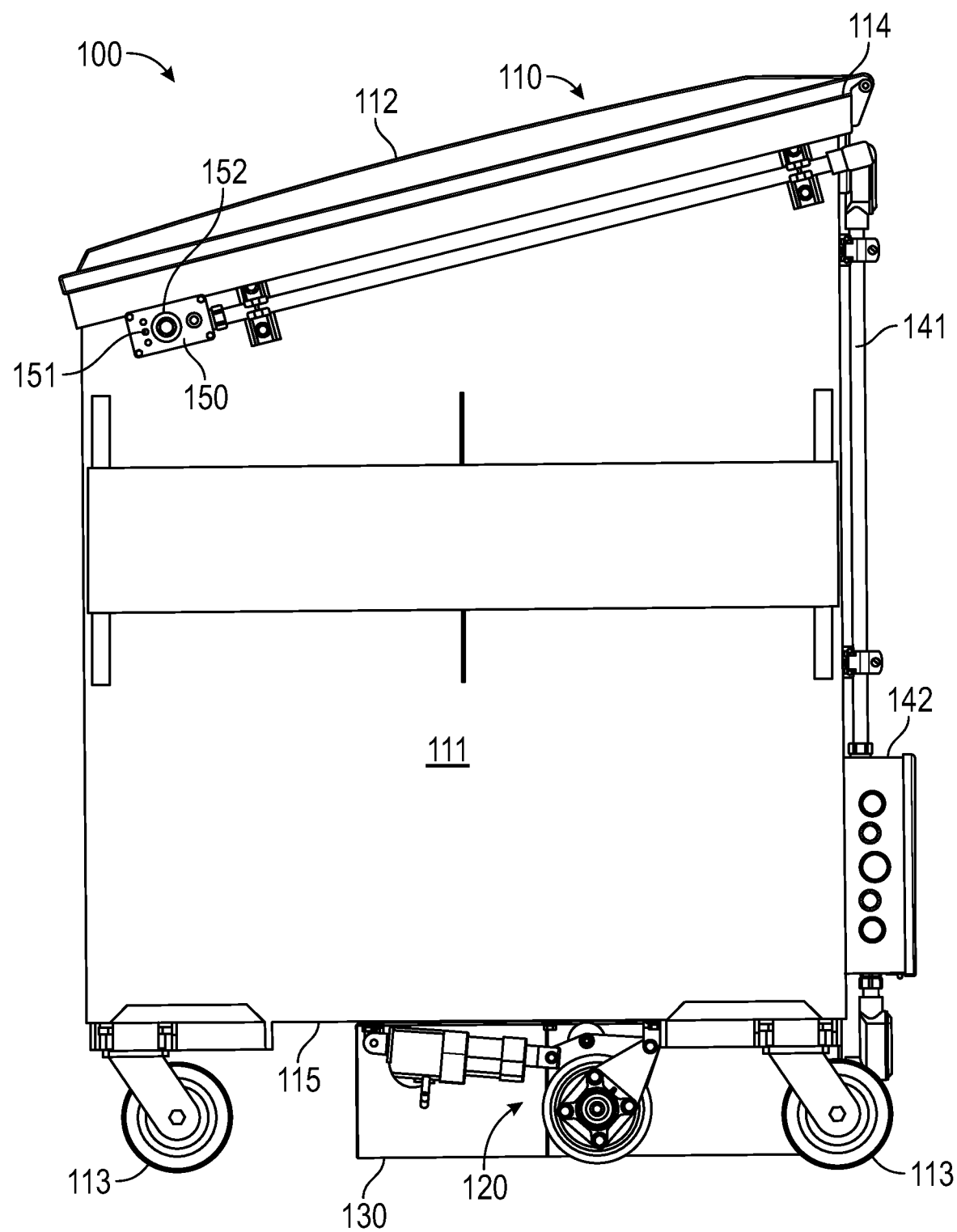
FIG. 2 shows a side view of the computer-controlled rubbish container in accordance with the first illustrated embodiment.

FIG. 2 shows a side view of the computer-controlled rubbish container (100) in accordance with the first illustrated embodiment. The computer-controlled rubbish container comprises a motorized wheel assembly (120) coupled to a bottom portion (115) of a rubbish container (110). The rubbish container includes a top portion (114), one or more lids (112), and a receptacle body (111) extending between the top and bottom portion. The rubbish container further includes a plurality of casters (113) coupled to the bottom portion near each corner. The plurality of casters is not coupled to a motor or a power source and moves only while engaged with a ground surface in addition to a horizontal force being applied to the rubbish container, such as by a WME moving the rubbish container to a desirable location. The motorized wheel assembly is coupled to a power source (142) and a control circuit (not shown). A wheel assembly shield (130) is shown protecting portions of the motorized wheel assembly from accidental damage. Also included is a manual control (500) having one or more LED indicators (151) and an emergency stop button (152).

The motorized wheel assembly (120) can either be installed during the manufacturing of the rubbish container, or alternatively, may be added after the rubbish container is already manufactured, thereby allowing existing rubbish containers to be converted into computer-controlled rubbish containers (100).

Figure 3:
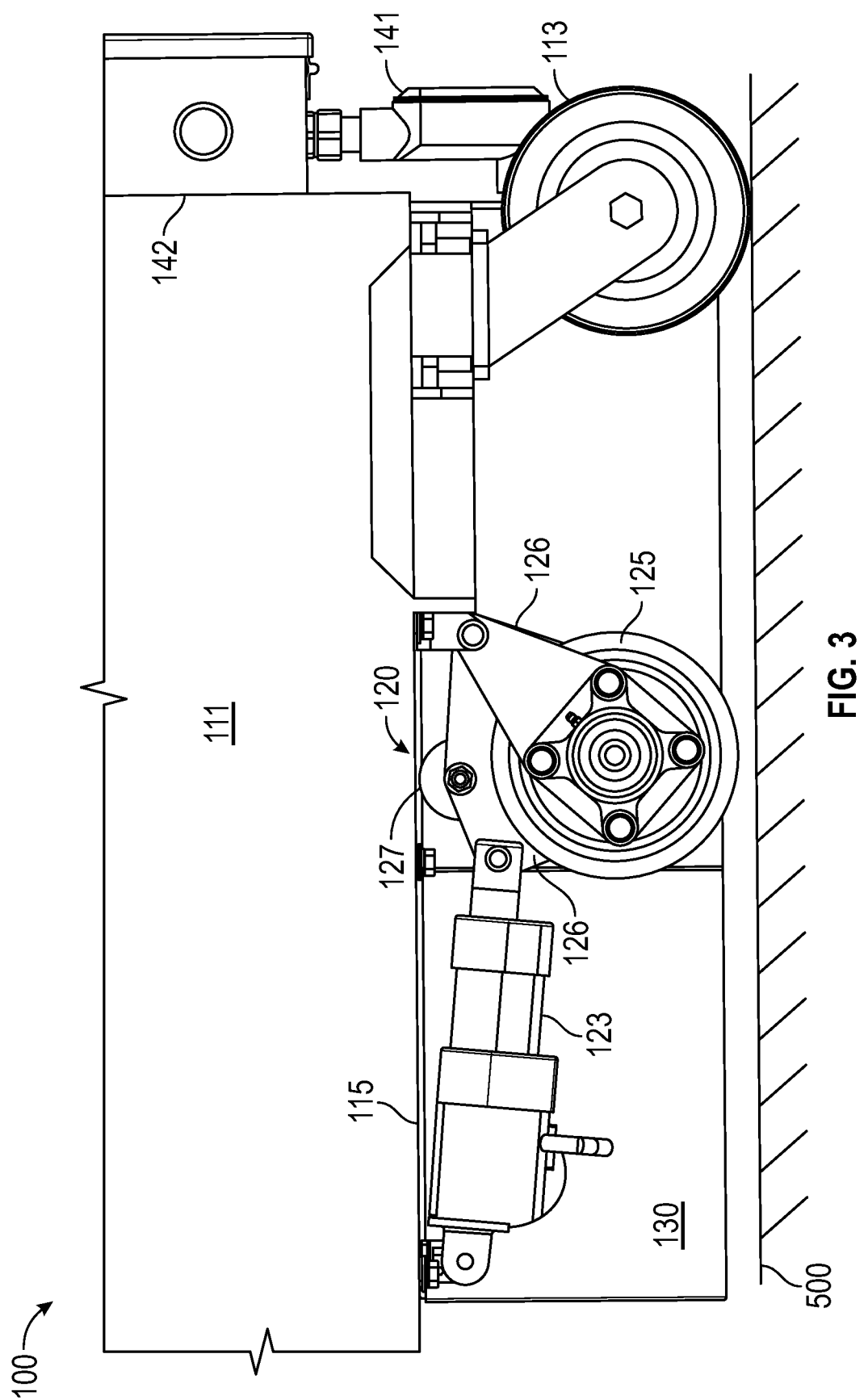
FIG. 3 shows a side view of the computer-controlled rubbish container in a retracted state according to the first illustrated embodiment.

FIG. 3 shows a side view of the computer-controlled rubbish container (100) in a retracted state according to the first illustrated embodiment. The computer-controlled rubbish container comprises a motorized wheel assembly (120) having an actuator (123) coupled to a wheel (125) at a wheel bracket (126). The motorized wheel assembly and a plurality of casters (113) are each disposed at a bottom portion (115). As shown, the actuator is in a retracted state whereby the wheel is raised and at a higher elevation than the plurality of casters. In the retracted state, the plurality of casters is engaged with a ground surface (500) wherein the plurality of casters is free to move upon an external horizontal force applied to the computer-controlled rubbish container. A bumper (127) is coupled to the wheel and/or wheel bracket and is configured to make contact with the bottom portion while the actuator is in a retracted state, thereby inhibiting the actuator from fully retracting, which could cause the actuator to lock into position and no longer be able to raise and/or lower the wheel. In a preferred embodiment, the wheel is configured not to rotate while the actuator is in a retracted state and the wheel is disengaged from the ground surface.

Figure 4:
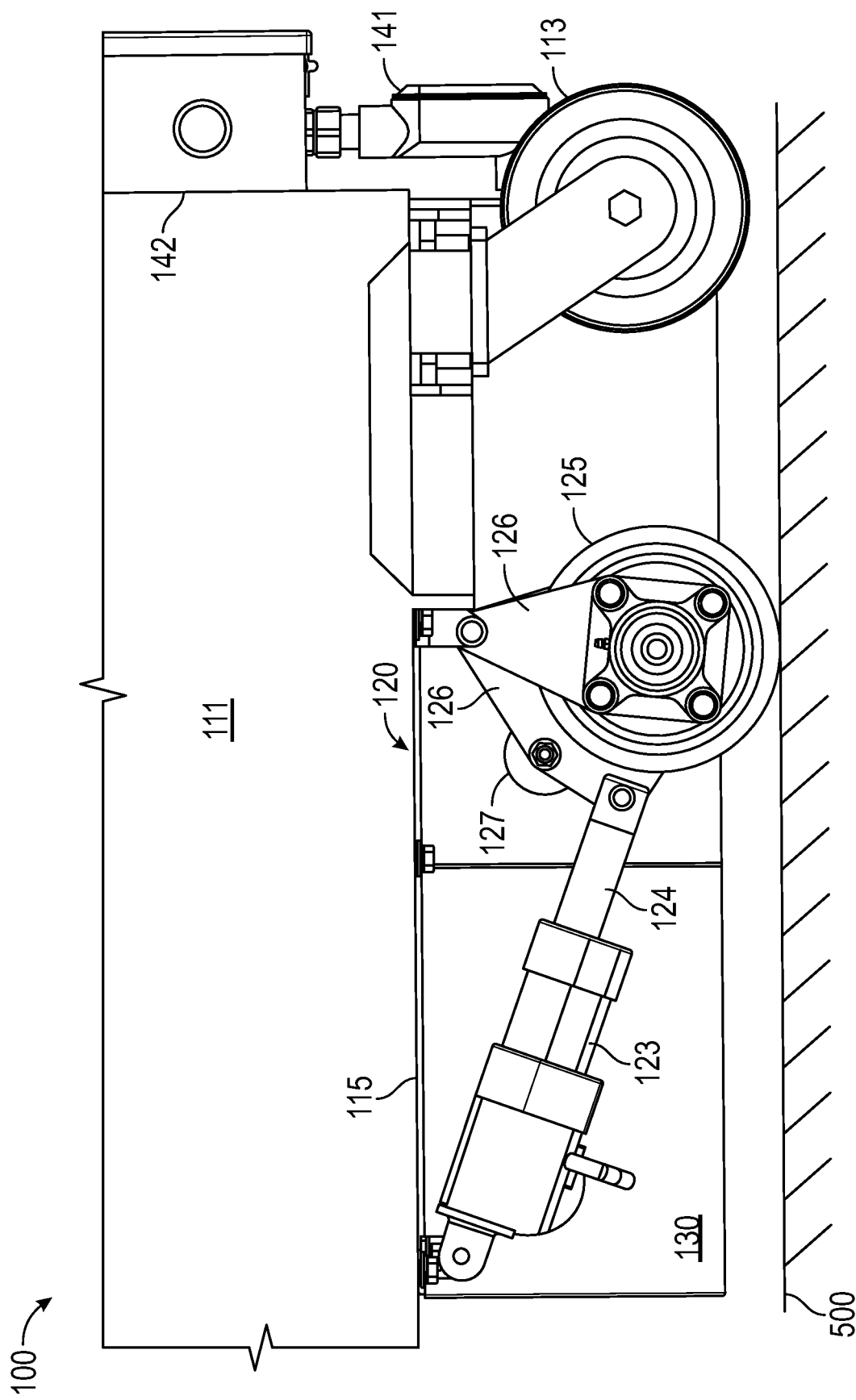
FIG. 4 shows a side view of computer-controlled rubbish container in an expanded state according to the first illustrated embodiment.

FIG. 4 shows a side view of computer-controlled rubbish container (100) in an extended state according to the first illustrated embodiment. Here, an actuator (123) having an actuator arm (124) is in the extended state such that a wheel (125) is a at lower elevation than a plurality of casters (113). The actuator may couple to the wheel or a wheel bracket (235). While the actuator is in the extended state, the wheel is engaged with a ground surface (500) and the plurality of casters are disengaged from the ground surface such that there is a gap between the plurality of casters and the ground surface. While in this particular state, the computer-controlled rubbish container is unable to move my manual force since the plurality of casters, which are used for manual movement, are not engaged with the ground surface. The wheel of the motorized wheel assembly (120) is configured to move upon force from a motor (not shown). One having skill in the art will appreciate that while the wheel is engaged with the ground surface, a bottom portion (115) of the computer-controlled rubbish container is further from the ground surface than when the plurality of casters is engaged with the ground surface.

The dumpster of the first illustrated embodiment is configured for computerized-control, including computerized driving, parking, and charging of a power bank (rechargeable batteries contained in or near the control box).

Figure 5:
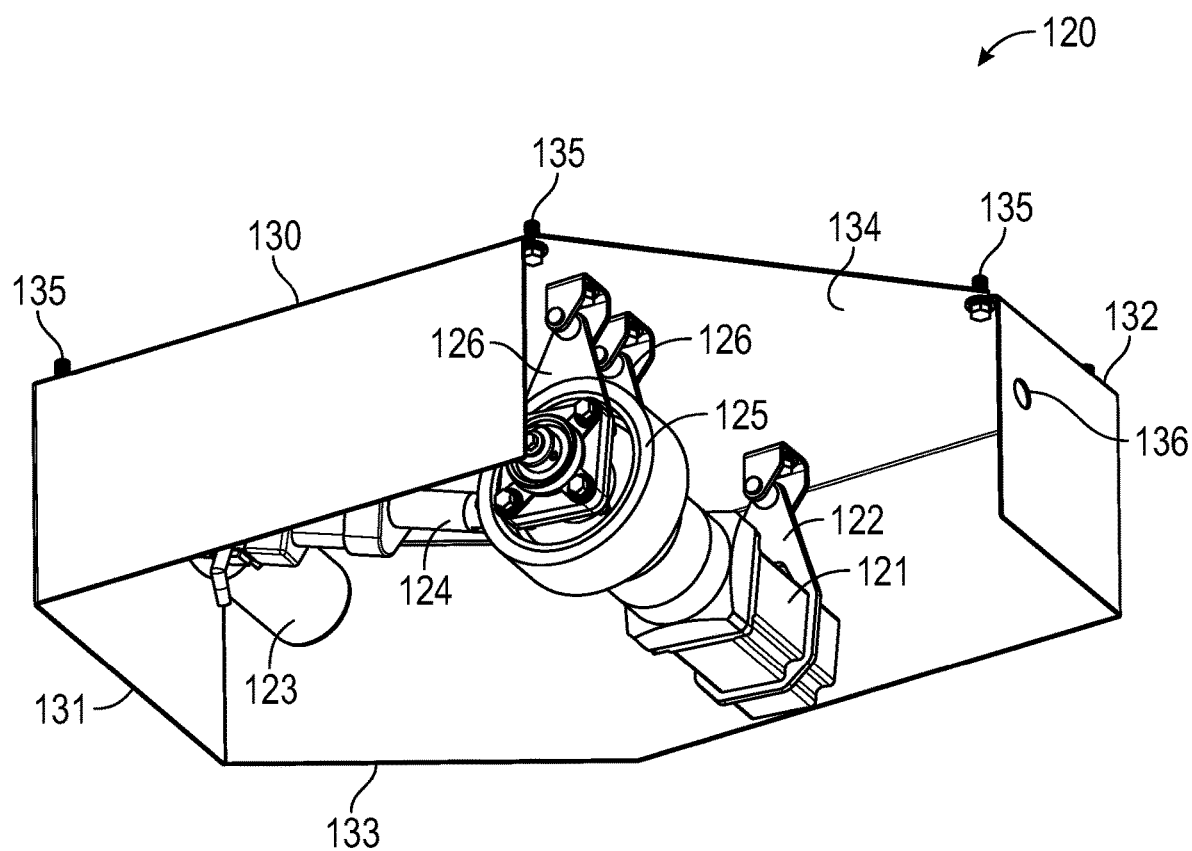
FIG. 5 shows a perspective view of a motorized wheel assembly in accordance with the first illustrated embodiment.

FIG. 5 shows a perspective view of a motorized wheel assembly (120) in accordance with the first illustrated embodiment. The motorized wheel assembly includes an actuator (123) coupled to a wheel (125), and the wheel further coupled to an electric motor (121). Surrounding a portion of the motorized wheel assembly is a wheel assembly shield (130). One or more wheel brackets (126) are coupled to the wheel and further hingedly coupled to the wheel assembly shield. One or more motor brackets (122) are coupled to the electric motor and further hingedly coupled to the wheel assembly shield. When the actuator is in an extended state, an actuator arm (124) extends outward and causes the wheel and electric motor to rotate about a surface the motor and wheel brackets are hingedly coupled therewith, which causes the wheel to raise and lower relative to said surface.

The wheel assembly shield (130) is configured to couple to a bottom portion of a rubbish container such that with the motorized wheel assembly (120) coupled to the wheel assembly shield, the motorized wheel assembly will additionally be coupled to the bottom portion of the rubbish container. In alternative embodiments, the motorized wheel assembly will couple directly to the bottom portion.

The wheel assembly shield (130) comprises a proximal end (131) and a distal end (132). Coupled to the proximal end is a slanted wall (133) configured to receive force from a forklift or similar object and redirect the object back near a center of the rubbish container. The wheel assembly shield further comprises a shield opening (134) to prevent interference with one of a plurality of casters (not shown) disposed at corners of the rubbish container. The wheel assembly shield further includes fasteners (135) and a plurality of apertures (136) for ease of mounting to the bottom portion.

Figure 6:
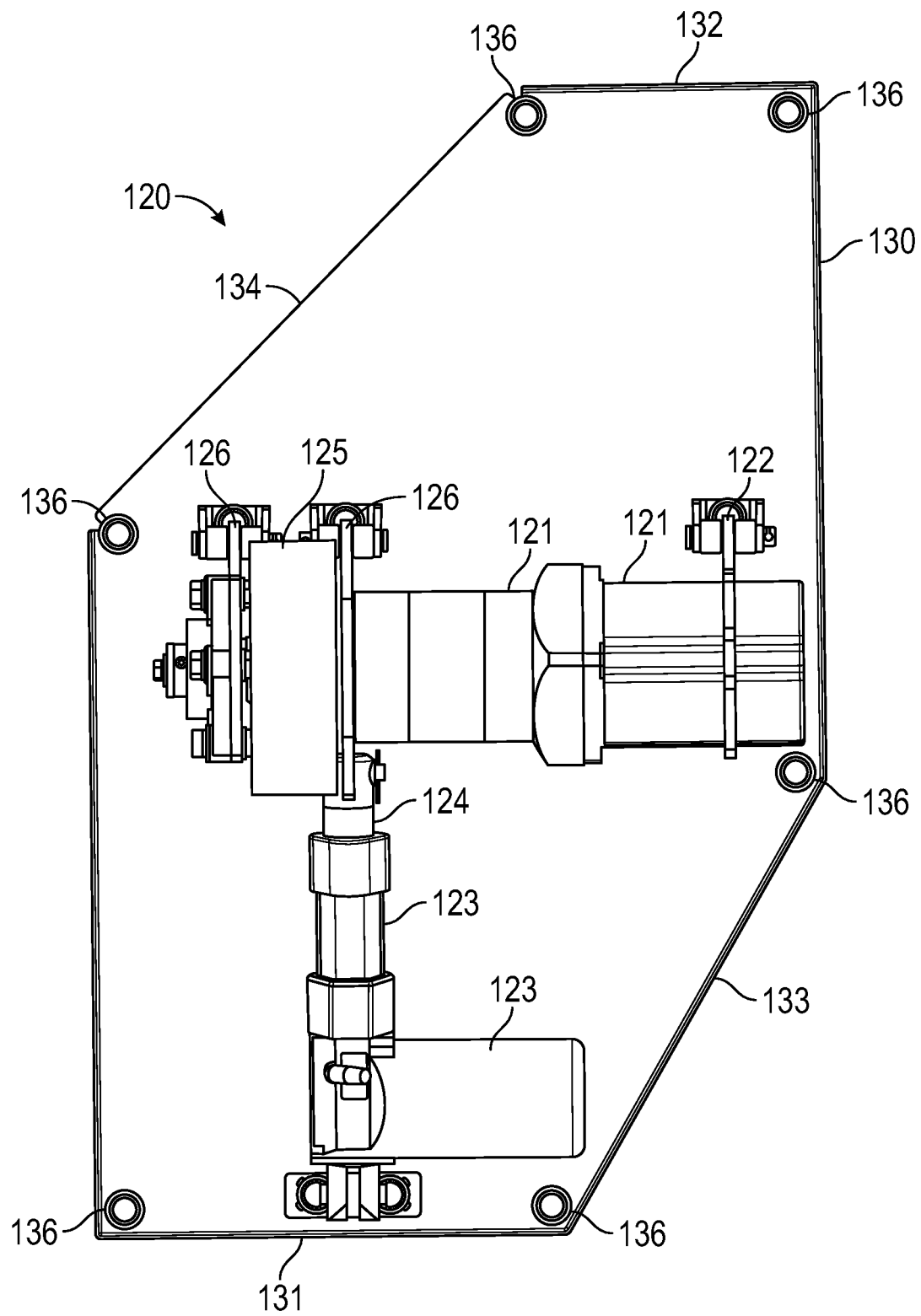
FIG. 6 shows a plan view of the motorized wheel assembly in accordance with the first illustrated embodiment.

FIG. 6 shows a plan view of the motorized wheel assembly (120) in accordance with the first illustrated embodiment. The motorized wheel assembly comprises a wheel (125) coupled to an electric motor (121) and further coupled to an actuator (123). The electric motor, wheel, and actuator are each hingedly coupled to a wheel assembly shield (130). Wheel brackets (126) are coupled to each sidewheel, and said wheel brackets further coupled to the wheel assembly shield to provide rotational movement of the wheel. Likewise, a motor bracket (122) is coupled to the electric motor and further coupled to the wheel assembly shield to provide rotational movement of the engine. As shown, an actuator arm (124) is coupled to the wheel bracket such that when the actuator arm extends or retracts from the actuator, a tangential force is applied to the wheel bracket causing the wheel bracket, and consequentially the wheel, to rotate. The electric motor moves in a similar matter due to the electric motor being coupled to the wheel. In other embodiments, the actuator couples to other locations such as the electric motor or motor bracket.

The wheel assembly shield (130) comprises a proximal end (131) and a distal end (132) opposite the proximal end. The proximal end is defined as a side most close to a front of a rubbish container where a user would open a lid and dispose of trash. As shown, the motorized wheel assembly (120) is designed for attachment to a left side of a rubbish container. The wheel assembly shield includes a slanted wall (133) configured to redirect incoming objects, such as a forklift, away from the motorized wheel assembly and thereby preventing damage. Angle of the slanted wall relative to the proximal end comprises an angle between 90 and 180 degrees, and preferably between 120 and 150 degrees. Opposite the slanted wall is a shield opening (134) to allow for ease of installation to a variety of rubbish containers by allow for a clearance to a plurality of casters (not shown)

Any of the above features as set forth in the General Embodiment, above, may be additionally or alternatively implemented for enhancing the function of the rubbish container.

Second Illustrated Embodiment

Figure 7:
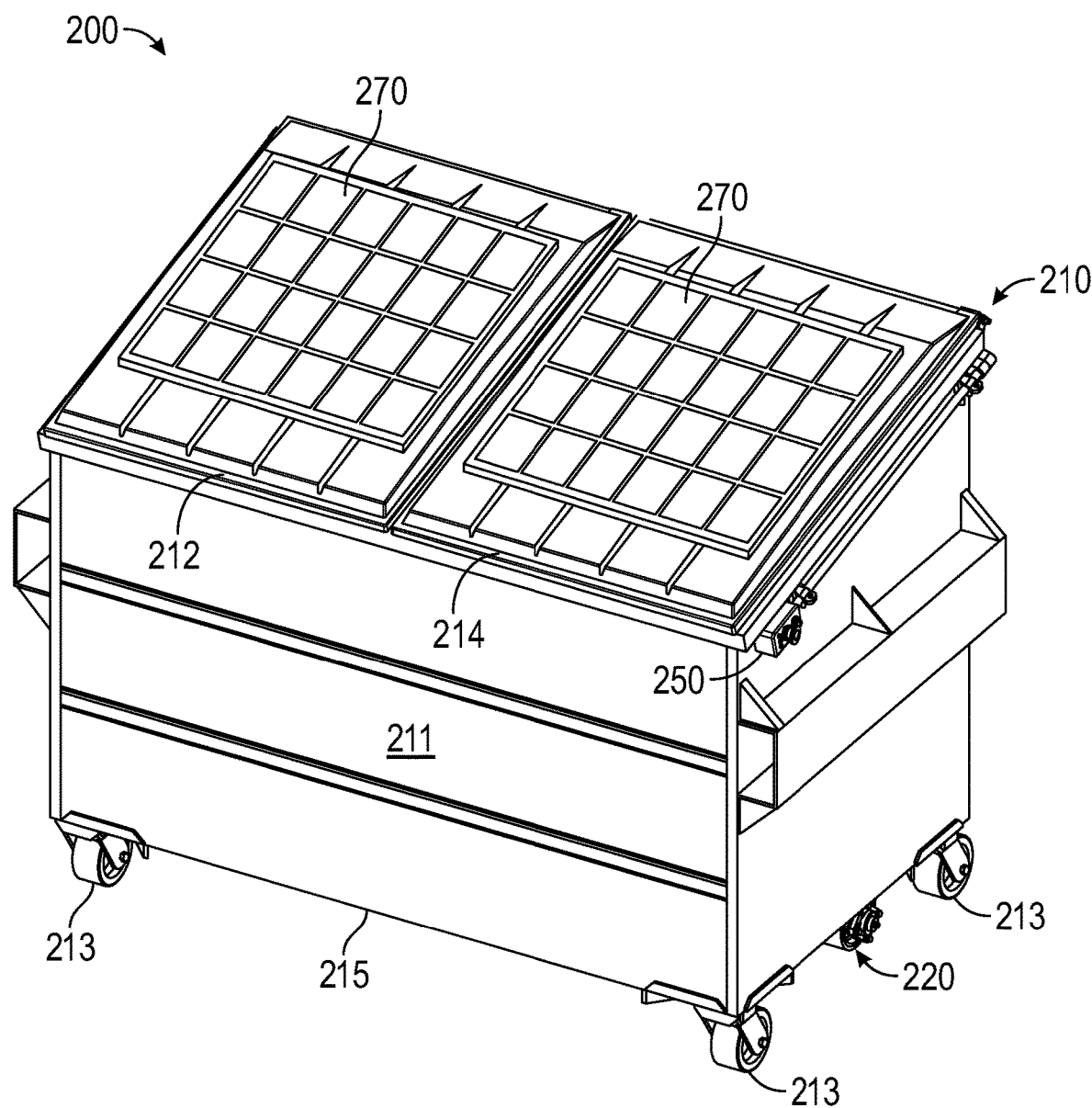
FIG. 7 shows perspective view of a computer-controlled rubbish container in accordance with a second illustrated embodiment.

FIG. 7 shows perspective view of a computer-controlled rubbish container (200) in accordance with a second illustrated embodiment. The computer-controlled rubbish container includes a rubbish container (210) having one or more lids (212) hingedly coupled to a top portion (214). A plurality of casters (213) is coupled to a bottom portion (215) and a receptacle body (211) extends between the top portion and bottom portion. A motorized wheel assembly (220) can be seen disposed between a pair of the plurality of casters. Disposed on the one or more lids is a solar panel (270) configured to convert sunlight into electricity for recharging a battery comprised therewith. In some embodiments, the rubbish container is stored in a location where exposure to sun is minimal, which requires the solar panel to be located on a nearby structure and electrically coupled to the rubbish container to maximize efficiency of the solar panel.

Third Illustrated Embodiment

Figure 8:
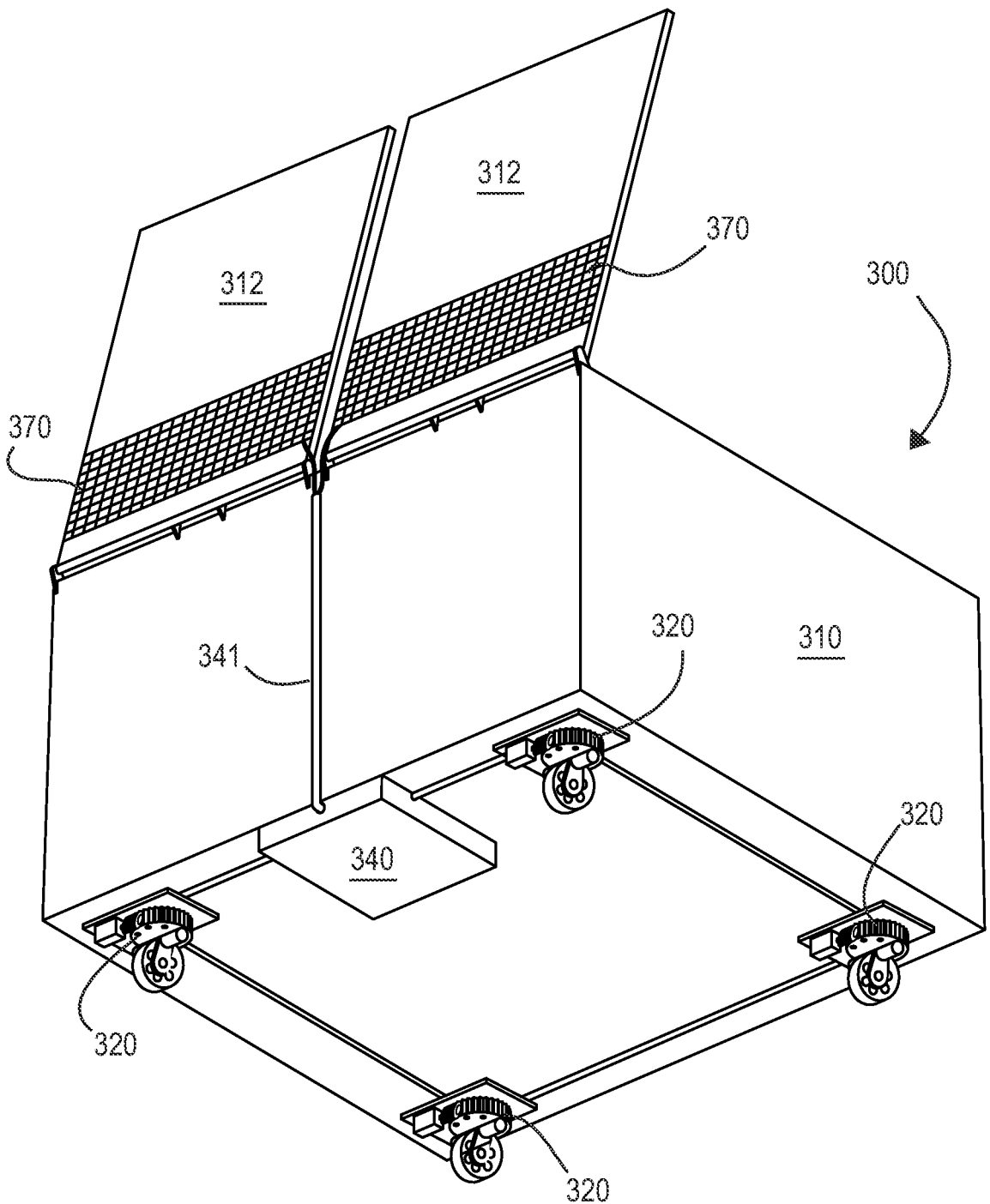
FIG. 8 shows a bottom perspective view of a computer-controlled rubbish container in accordance with a third illustrated embodiment.
Figure 9A:
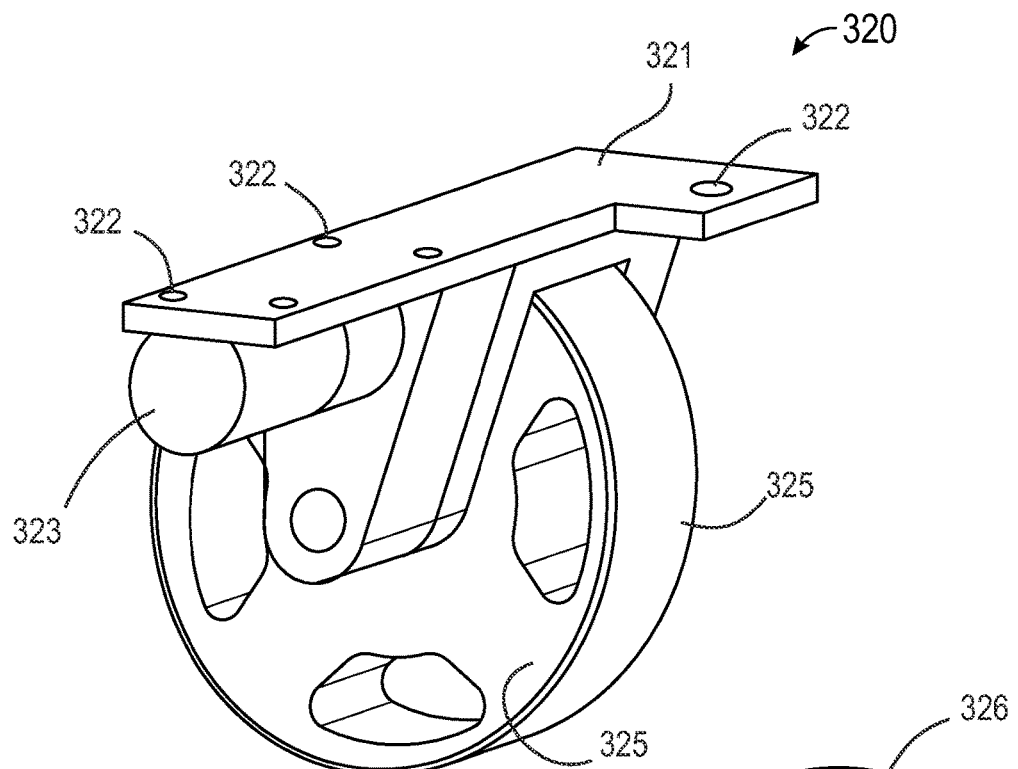
FIG. 9A shows a perspective view of a computer-controlled wheel assembly in accordance with the third illustrated embodiment.
Figure 9B:
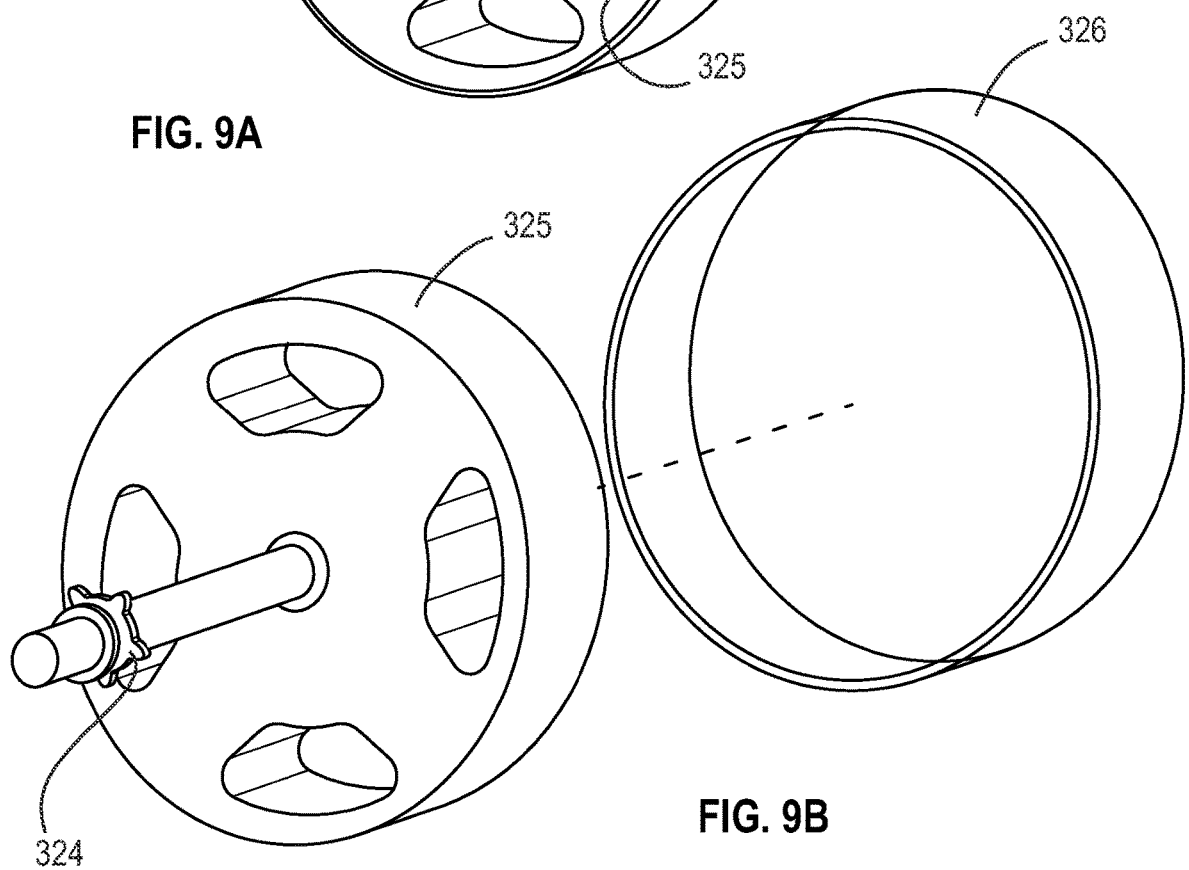
FIG. 9B shows an exploded view of the computer-controlled wheel assembly in accordance with the third illustrated embodiment.
Figure 10:
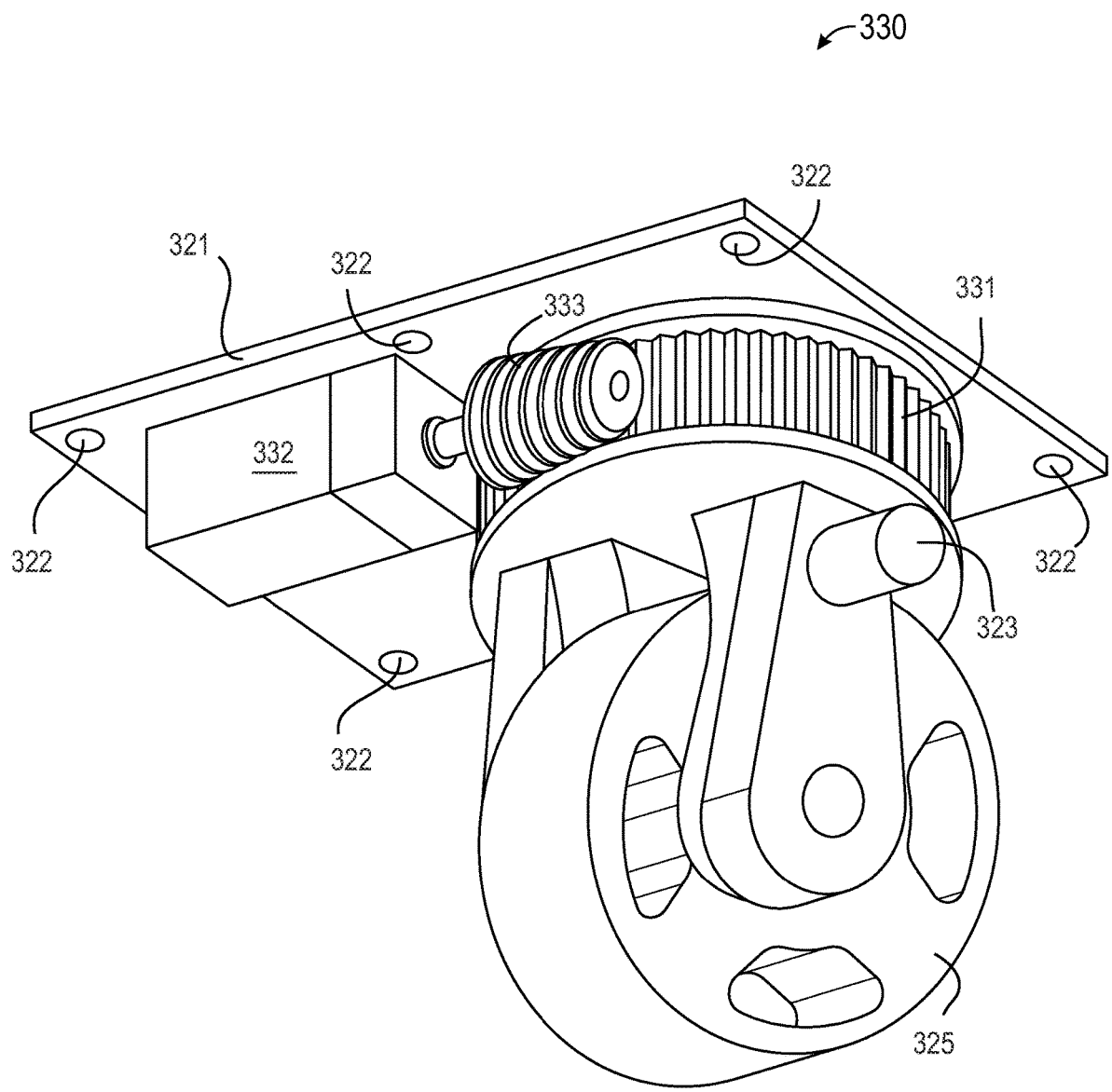
FIG. 10 shows a perspective view of an alternative wheel assembly for integration with a rubbish container according to the third illustrated embodiment.

In a third illustrated embodiment, as shown in FIGS. 8-10, a commercial rubbish container (dumpster) is improved with a combination of one or more of the disclosed features to form a computer-controlled rubbish container.

FIG. 8 shows an improved dumpster (300) configured for computerized control. The dumpster is shown having solar panels (370) coupled to the lid portions (312), wiring & wiring conduit (341) extending from a connection at the solar panels to a control box (340), and a computerized wheel assembly (320) coupled to the control box. It should be understood that the dumpster in this embodiment includes the illustrated features as primary components; however, one or more additional features as described in the above general embodiment may be optionally incorporated to enhance function of the computer-controlled rubbish container.

FIGS. 9(A-B) show a computer-controlled wheel assembly (320) for integration with some of the rubbish containers disclosed herein. FIG. 9A shows an assembled wheel assembly; whereas FIG. 9B shows an exploded view of the wheel assembly. The wheel assembly may comprise a mount (321), which is generally planar and includes a plurality of pre-drilled holes (322) for mounting with the receptacle body of a dumpster or other structure using conventional fasteners (not shown). In addition, the wheel assembly comprises a chain-housing (323) for containing a chain (not shown, inside chain housing) which couples a wheel sprocket (324) (fixed to the wheel) to an electric motor (not shown, inside chain housing) such that the electric motor is configured to mechanically translate the wheel for driving in a forward, or forward and reverse direction. The wheel assembly may further comprise gears (not shown, but conventional in the art) for gearing the motor to the sprocket. The wheel assembly comprises a tire (326), which may optionally include a non-marking tire, and which generally encircles a wheel (325).

FIG. 10 shows another computer-controlled wheel assembly (330) for integration with the rubbish containers disclosed herein. In this illustration, the wheel assembly is similar to that disclosed in FIG. 9 with the addition of rotational componentry, including, a turning gear (331) disposed between the wheel (325) and the mount (321), an electric turning motor (332), and a turning motor gear (333) engaging the electric turning motor with the turning gear. Other rotating wheel assemblies may be similarly implemented for turning and/or driving the wheels of the rubbish container.

In this regard, the dumpster of the first illustrated embodiment is configured for computerized-control, including computerized driving, parking, and charging of a power bank (rechargeable batteries contained in or near the control box).

Any of the features as set forth in the General Embodiment, above, may be additionally or alternatively implemented for enhancing the desired function of the dumpster.

Any of the above features as set forth in the General Embodiment, above, may be additionally or alternatively implemented for enhancing the function of the rubbish container.

FEATURE LIST computer-controlled rubbish container (100; 200; 300)
rubbish container (110; 220; 310)
receptacle body (111; 211)
one or more lids (112; 212; 312)
plurality of casters (113; 213)
top portion (114; 214)
bottom portion (115; 215)
motorized wheel assembly (120; 220)
electric motor (121)
motor bracket (122)
actuator (123)
actuator arm (124)
wheel (125; 325)
wheel bracket (126)
bumper (127)
wheel assembly shield (130)
proximal end (131)
distal end (132)
slanted wall (133)
shield opening (134)
fasteners (135)
plurality of apertures (136)

control circuit (140; 340)
wiring and wiring conduit (141; 341; 441)
power bank (142)
manual control (150; 250)
LED indicator (151)
emergency stop button (152)
solar panel (270; 370; 470)
computerized wheel assembly (320; 330)
mount (321)
plurality of pre-drilled holes (322)
chain housing (323)
wheel sprocket (324)
tire (326)
turning gear (331)
electric turning motor (332)
turning motor gear (333)
ground surface (500)

What is claimed is:

1. A computer-controlled rubbish container comprising:
a rubbish container having a top portion and a bottom portion and a receptacle body extending therebetween;
two or more motorized wheel assemblies coupled to the bottom portion,
each of the motorized wheel assemblies comprising:
an electric motor,
a wheel coupled to the electric motor,
an actuator coupled to the wheel, and
a motor bracket hingedly coupled to the bottom portion and further coupled to the electric motor, and a wheel bracket hingedly coupled to the bottom portion and further coupled to the wheel,
wherein upon extension of the actuator, the wheel is configured to engage with a ground surface, and upon retraction of the actuator the wheel is configured to disengage from the ground surface;
a plurality of casters coupled to the bottom portion of the rubbish container, wherein the plurality of casters is engaged to the ground surface when the actuator is in a retracted state, and the plurality of casters is disengaged from the ground surface when the actuator is in an extended state;
a wheel assembly shield coupled to the bottom portion and configured to surround at least a portion of the motorized wheel assembly;
a power bank for providing a power source to the electric motor and actuator; and
a control circuit coupled to the electric motor;
wherein the control circuit is configured to receive a wireless signal comprising said driving instructions for achieving remote drive capability.

2. The computer-controlled rubbish container of claim 1, the wheel assembly shield further comprising a slanted wall.

3. The computer-controlled rubbish container of claim 1, the motorized wheel assembly further comprising a bumper coupled to a wheel bracket, wherein the bumper is configured to engage with the bottom portion and thereby inhibit over-retraction of the actuator.

4. The computer-controlled rubbish container of claim 1, further comprising one or more solar panels coupled to the rubbish container.

5. A computer-controlled rubbish container comprising:
a rubbish container having a top portion and a bottom portion and a receptacle body extending therebetween;
a motorized wheel assembly coupled to the bottom portion,
the motorized wheel assembly comprising an electric motor and a wheel coupled to the electric motor, and a motor bracket hingedly coupled to the bottom portion and further coupled to the electric motor, and a wheel bracket hingedly coupled to the bottom portion and further coupled to the wheel;
a power bank for providing a power source to the electric motor; and
a control circuit coupled to the electric motor, wherein the control circuit is configured to receive a wireless signal comprising said driving instructions for achieving remote drive capability.

6. The computer-controlled rubbish container of claim 5, the motorized wheel assembly further comprising an actuator coupled to the wheel wherein the wheel is configured to engage to a ground surface when the actuator is in an extended state, the wheel further configured to disengage from the ground surface when the actuator is in a retracted state.

7. The computer-controlled rubbish container of claim 6, further comprising a plurality of casters coupled to the bottom portion of the rubbish container, the plurality of casters is configured to engage the ground surface when the actuator is in the retracted state, the plurality of casters further configured to disengage from the ground surface when the actuator is in the extended state.

8. The computer-controlled rubbish container of claim 5, further comprising a wheel assembly shield coupled to the bottom portion of the rubbish container and configured to surround at least a portion of the motorized wheel assembly.

9. The computer-controlled rubbish container of claim 8, wherein the wheel assembly shield further comprises a slanted wall.

10. The computer-controlled rubbish container of claim 5, the motorized wheel assembly further comprising a bumper coupled to a wheel bracket, wherein the bumper is configured to engage with the bottom portion and thereby inhibit over-retraction of the actuator.

11. The computer-controlled rubbish container of claim 5, further comprising two or more motorized wheel assemblies.

12. The computer-controlled rubbish container of claim 5, further comprising one or more solar panels coupled to the rubbish container.

13. A motorized wheel assembly comprising:
an electric motor,
a wheel coupled to the electric motor,
a linear actuator coupled to the wheel, the electric motor, or both,
the linear actuator configured to extend and retract and wherein the wheel is configured to comprise a plurality of positions upon movement of the actuator; and
a bumper coupled to the wheel and configured to inhibit over-retraction of the linear actuator;
wherein the motorized wheel assembly is configured to couple to a bottom portion of a rubbish container.

14. The motorized wheel assembly of claim 13, further comprising a motor bracket coupled to the electric motor and a wheel bracket coupled to the wheel, wherein the motor bracket and wheel bracket are each configured to hingedly couple to the bottom portion.

15. The motorized wheel assembly of claim 13, further comprising a wheel assembly shield configured to couple to the bottom portion and further configured to surround at least a portion of the motorized wheel assembly.

* * * * *